United States Patent
Wang et al.

(10) Patent No.: US 10,680,468 B2
(45) Date of Patent: Jun. 9, 2020

(54) WIRELESS ENERGY EXTRACTING DEVICE AND METHOD

(71) Applicant: TLHM Co., Ltd., Chia-Yi (TW)

(72) Inventors: Nai-Chen Wang, Tainan (TW); Yong-Keong Tay, Chiayi (TW); Chia-Chen Chang, Taipei (TW)

(73) Assignee: TLHM CO., LTD., Chia-Yi (TW)

( * ) Notice: Subject to any disclaimer, the term of this patent is extended or adjusted under 35 U.S.C. 154(b) by 21 days.

(21) Appl. No.: 16/176,960

(22) Filed: Oct. 31, 2018

(65) Prior Publication Data

US 2020/0021145 A1    Jan. 16, 2020

(30) Foreign Application Priority Data

Jul. 12, 2018   (TW) .............................. 107124038 A

(51) Int. Cl.
*H02J 50/70* (2016.01)
*H04W 52/02* (2009.01)
*H02J 50/80* (2016.01)
*H02J 50/20* (2016.01)

(52) U.S. Cl.
CPC .............. *H02J 50/70* (2016.02); *H02J 50/20* (2016.02); *H02J 50/80* (2016.02); *H04W 52/0274* (2013.01)

(58) Field of Classification Search
CPC ............ H02J 50/70; H02J 50/80; H02J 50/20; H04W 52/0274
USPC ............................................. 307/104, 44, 66
See application file for complete search history.

(56) References Cited

U.S. PATENT DOCUMENTS 9,703,341 B1 *   7/2017   Sultenfuss ................ G06F 1/26

\* cited by examiner

*Primary Examiner* — Michael R. Fin
(74) *Attorney, Agent, or Firm* — Muncy, Geissler, Olds & Lowe, P.C.

(57) ABSTRACT

A wireless energy extracting device includes: a radio frequency (RF) generator module for wirelessly receiving an RF charging signal to generate electrical energy; a capacitor module; and an energy management module coupled to the RF generator module and the capacitor module, and used to be coupled further to an energy consuming device. The energy management module performs electrical energy transfer from at least the RF generator module to at least the energy consuming device. Therefore, the wireless energy extracting device has relatively low electrical energy loss and thus relatively high energy usage efficiency.

6 Claims, 3 Drawing Sheets

WIRELESS ENERGY EXTRACTING DEVICE AND METHOD

CROSS-REFERENCE TO RELATED APPLICATION

This application claims priority of Taiwanese Patent Application No. 107124038, filed on Jul. 12, 2018.

FIELD

The disclosure relates to energy extraction, and more particularly to a wireless energy extracting device and a wireless energy extracting method.

BACKGROUND

Wireless charging technology is widely used in devices such as mobile devices, electric cars, home appliances, etc. In radio frequency (RF) charging, a transmitter wirelessly transmits a radio wave, which is received by a receiver wirelessly to generate electrical energy. The RF charging has several traits that contribute to its popularity, gradually becoming the mainstream wireless charging technology: multiple receivers can receive the radio wave simultaneously, and a distance between each receiver and the transmitter can be greater than 4.5 meters.

First, a conventional receiver stores the electrical energy generated from the radio wave in an energy storage element (e.g., a lithium battery), and then outputs the electrical energy released from the energy storage element to an energy consuming device. Since the conventional receiver always performs electrical energy transfer twice on the electrical energy generated from the radio wave, it has relatively high electrical energy loss and thus relatively low energy usage efficiency.

SUMMARY

Therefore, an object of the disclosure is to provide a wireless energy extracting device and a wireless energy extracting method that can alleviate at least one drawback of the prior art.

According to an aspect of the disclosure, the wireless energy extracting device includes a radio frequency (RF) generator module, a capacitor module and an energy management module. The RF generator module is for wirelessly receiving an RF charging signal to generate electrical energy. The energy management module is coupled to the RF generator module and the capacitor module, is used to be coupled further to an energy consuming device, and performs electrical energy transfer among the RF generator module, the capacitor module and the energy consuming device. When the energy management module determines that output power of the RF generator module is greater than or equal to power required by the energy consuming device, the energy management module operates in a first state where electrical energy transfer from the RF generator module to at least the energy consuming device is performed. When the energy management module determines that the output power of the RF generator module is smaller than the power required by the energy consuming device, the energy management module operates in a second state where electrical energy transfer from the RF generator module and the capacitor module to the energy consuming device is performed.

According to another aspect of the disclosure, the wireless energy extracting method is to be implemented in a wireless energy extracting device. The wireless energy extracting device includes a radio frequency (RF) generator module, a capacitor module, and an energy management module that is coupled to the RF generator module, the capacitor module and an energy consuming device. The wireless energy extracting method includes: (A) wirelessly receiving, by the RF generator module, an RF charging signal to generate electrical energy; and (B) performing, by the energy management module, electrical energy transfer among the RF generator module, the capacitor module and the energy consuming device. Step (B) includes: (B1) when it is determined by the energy management module that output power of the RF generator module is greater than or equal to power required by the energy consuming device, operating, by the energy management module, in a first state where electrical energy transfer from the RF generator module to at least the energy consuming device is performed; and (B2) when it is determined by the energy management module that the output power of the RF generator module is smaller than the power required by the energy consuming device, operating, by the energy management module, in a second state where electrical energy transfer from the RF generator module and the capacitor module to the energy consuming device is performed.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
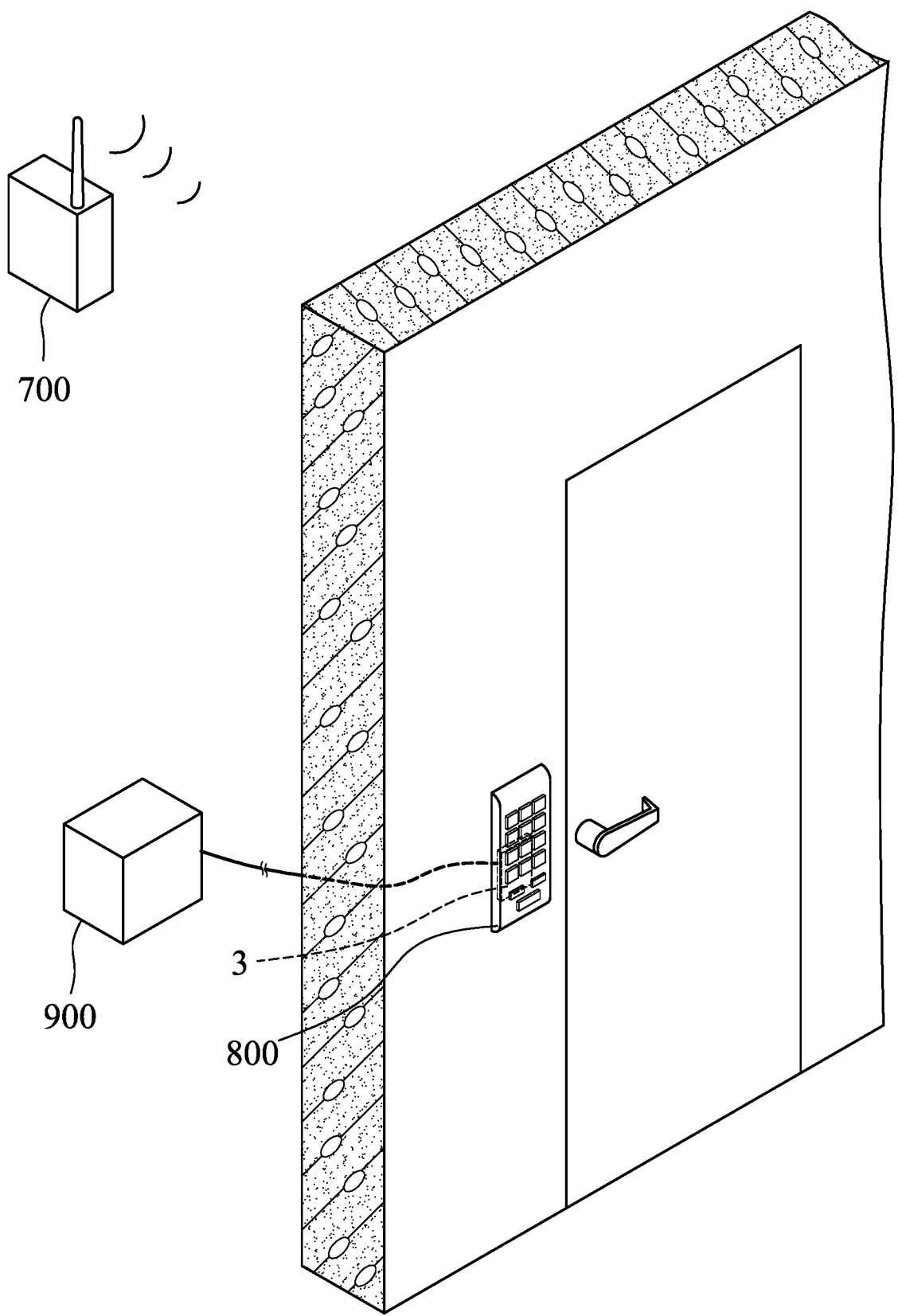
FIG. 1 is a structural diagram illustrating a use of an embodiment of a wireless energy extracting device according to the disclosure in an electronic lock.
Figure 2:
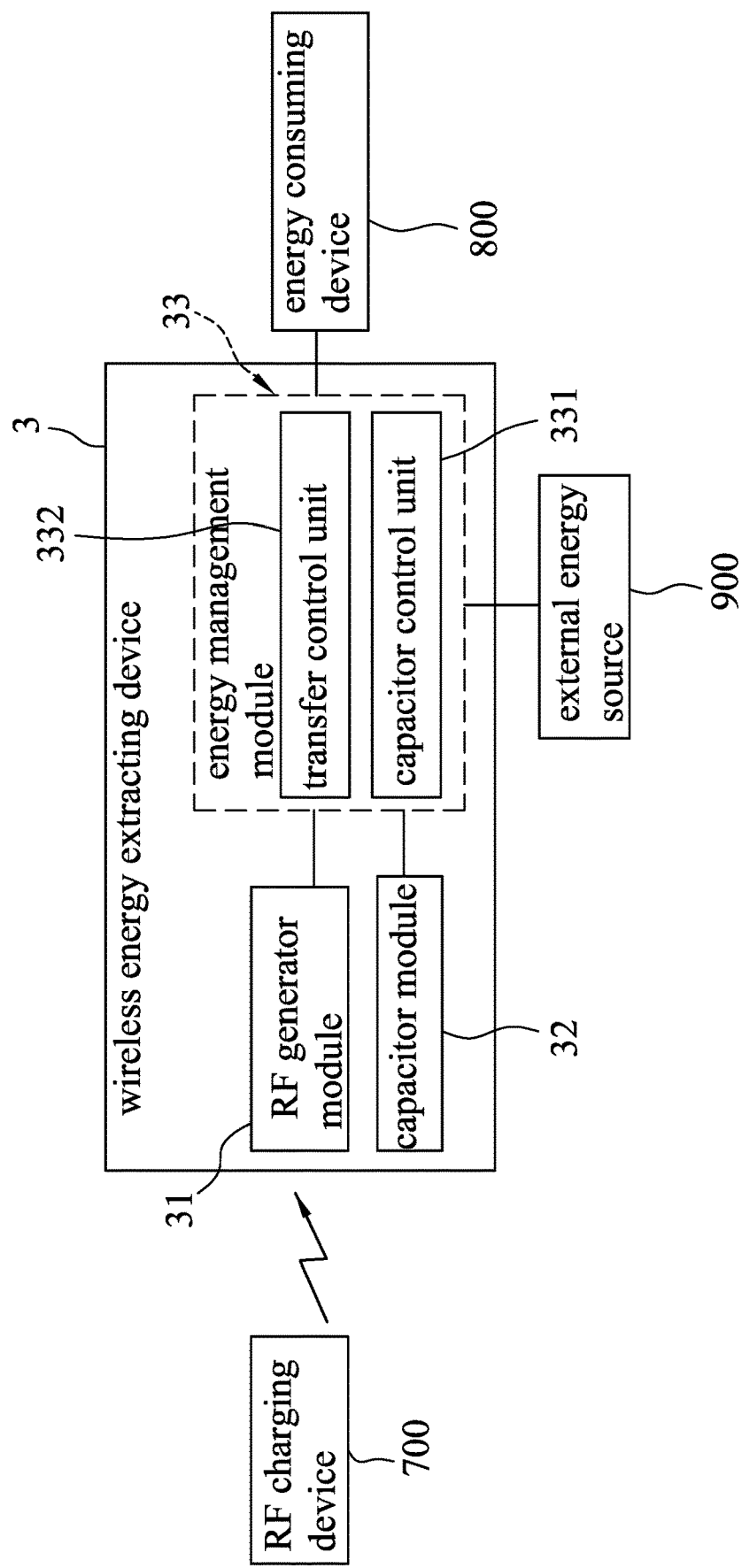
FIG. 2 is a block diagram illustrating the embodiment.

Referring to FIGS. 1 and 2, an embodiment of a wireless energy extracting device 3 according to the disclosure is operatively associated with an external energy source 900, an energy consuming device 800 and a radio frequency (RF) charging device 700. The external energy source 900 is, for example, an electrical grid, a battery, a photovoltaic device, a wind turbine or an electric generator. The energy consuming device 800 is, for example, an electronic lock as shown in FIG. 1, a mobile device, an access control device, an electric car or a home appliance.

The wireless energy extracting device 3 of this embodiment includes a radio frequency (RF) generator module 31, a capacitor module 32 and an energy management module 33. The RF generator module 31 is for wirelessly receiving an RF charging signal from the RF charging device 700 to generate electrical energy. The energy management module 33 is coupled to the RF generator module 31 and the capacitor module 32, is used to be coupled further to the energy consuming device 800 and the external energy source 900, and performs electrical energy transfer among the RF generator module 31, the capacitor module 32, the energy consuming device 800 and the external energy source 900.

The capacitor module 32 is, for example, a supercapacitor. In addition, the capacitor module 32 may, together with the RF generator module 31 and the energy management module 33, be disposed on a circuit board (not shown), which is beneficial to reduce a size of the wireless energy extracting device 3 of this embodiment, and to reduce a size of the energy consuming device 800 when the wireless energy extracting device 3 of this embodiment is installed in the energy consuming device 800. However, the disclosure is not limited thereto.

In this embodiment, the energy management module 33 includes a capacitor control unit 331 and a transfer control unit 332.

The capacitor control unit 331 detects a residual electric quantity of the capacitor module 32, and is operable to cause the capacitor module 32 to perform one of storing electrical energy and releasing electrical energy stored therein.

The transfer control unit 332 detects output power of the RF generator module 31, and estimates power required by the energy consuming device 800. When the transfer control unit 332 determines that the estimated power required by the energy consuming device 800 is non-zero (e.g., the energy consuming device 800 is not in a standby mode), the transfer control unit 332 cooperates with the capacitor control unit 331 to perform electrical energy transfer based on the detected output power of the RF generator module 31, the estimated power required by the energy consuming device 800 and the detected residual electric quantity of the capacitor module 32.

When the transfer control unit 332 determines that the detected output power of the RF generator module 31 is greater than or equal to the estimated power required by the energy consuming device 800, the energy management module 33 operates in a first state where electrical energy transfer from the RF generator module 31 to at least the energy consuming device 800 is performed.

In the first state, electrical energy transfer from the RF generator module 31 to the energy consuming device 800 and the capacitor module 32 is performed when the transfer control unit 332 determines that the detected output power of the RF generator module 31 is greater than the estimated power required by the energy consuming device 800 while the detected residual electric quantity of the capacitor module 32 is smaller than a predetermined saturation threshold. In detail, the transfer control unit 332 transfers a portion of the electrical energy generated by the RF generator module 31 to the energy consuming device 800, transfers the other portion of the electrical energy generated by the RF generator module 31 to the capacitor control unit 331, and controls the capacitor control unit 331 to cause the capacitor module 32 to store the other portion of the electrical energy generated by the RF generator module 31; and input power of the capacitor module 32 equals the output power of the RF generator module 31 minus the power required by the energy consuming device 800.

In the first state, electrical energy transfer from the RF generator module 31 to the energy consuming device 800 is performed when one of the following conditions is met: the transfer control unit 332 determines that the detected output power of the RF generator module 31 is equal to the estimated power required by the energy consuming device 800; and the transfer control unit 332 determines that the detected output power of the RF generator module 31 is greater than the estimated power required by the energy consuming device 800 while the detected residual electric quantity of the capacitor module 32 is greater than or equal to the saturation threshold. In detail, the transfer control unit 332 transfers at least a portion of the electrical energy generated by the RF generator module 31 to the energy consuming device 800.

When the transfer control unit 332 determines that the detected output power of the RF generator module 31 is smaller than the estimated power required by the energy consuming device 800 while the detected residual electric quantity of the capacitor module 32 is greater than or equal to a lower limit value, the energy management module 33 operates in a second state where electrical energy transfer from the RF generator module 31 and the capacitor module 32 to the energy consuming device 800 is performed. In detail, the transfer control unit 332 controls the capacitor control unit 331 to cause the capacitor module 32 to release the electrical energy stored therein, and transfers the electrical energy generated by the RF generator module 31 and the electrical energy released by the capacitor module 32 to the energy consuming device 800; and output power of the capacitor module 32 equals the power required by the energy consuming device 800 minus the output power of the RF generator module 31.

When the transfer control unit 332 determines that the detected output power of the RF generator module 31 is smaller than the estimated power required by the energy consuming device 800 while the detected residual electric quantity of the capacitor module 32 is smaller than the lower limit value, the energy management module 33 operates in a third state where electrical energy transfer from the RF generator module 31 and the external energy source 900 to the energy consuming device 800 is performed. In detail, the transfer control unit 332 transfers the electrical energy generated by the RF generator module 31 and electrical energy outputted by the external energy source 900 to the energy consuming device 800; and output power of the external energy source 900 equals the power required by the energy consuming device 800 minus the output power of the RF generator module 31.

The transfer control unit 332 further sets the lower limit value to be equal to one of a predetermined discharge threshold (which is smaller than the saturation threshold) and a cutoff threshold (which is smaller than the discharge threshold). At default setting, the lower limit value is equal to the discharge threshold, is set to be equal to the discharge threshold when the energy management module 33 operates in any of the first and third states, and is set to be equal to the cutoff threshold when the energy management module 33 operates in the second state. It should be noted that the cutoff threshold may be a predetermined constant, or may be variable according to a difference between the detected output power of the RF generator module 31 and the estimated power required by the energy consuming device 800.

As a result, in a scenario where the output power of the RF generator module 31 is consecutively greater than the power required by the energy consuming device 800, and where the residual electric quantity of the capacitor module 32 is initially smaller than the saturation threshold, the energy management module 33 operates in the first state, and the capacitor module 32 is charged until the residual electric quantity thereof is increased to the saturation threshold.

In addition, in a scenario where the output power of the RF generator module 31 is consecutively smaller than the power required by the energy consuming device 800, and where the residual electric quantity of the capacitor module 32 is initially greater than or equal to the discharge threshold, the energy management module 3 operates in the second state and the capacitor module 32 is discharged until the residual electric quantity of the capacitor module 32 is decreased to the cutoff threshold, and thereafter the energy management module 3 operates in the third state and the capacitor module 32 is not discharged.

Moreover, in a scenario where the output power of the RF generator module 31 is consecutively smaller than the power required by the energy consuming device 800, and where the residual electric quantity of the capacitor module 32 is initially smaller than the discharge threshold, the energy management module 3 operates in the third state and the capacitor module 32 is not discharged.

Figure 3:
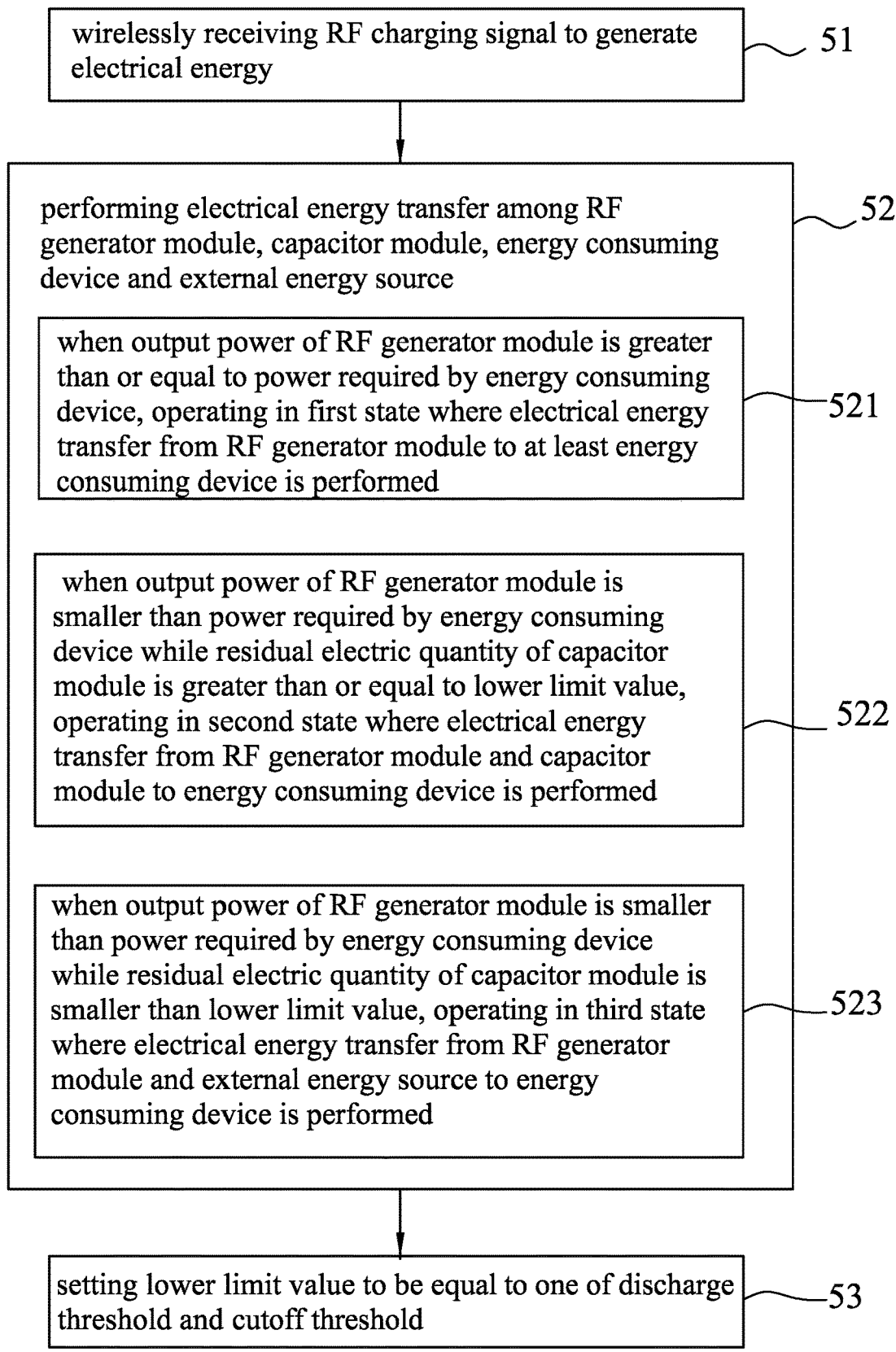
FIG. 3 is a flowchart illustrating a wireless energy extracting method performed by the embodiment.

Referring to FIGS. 2 and 3, a wireless energy extracting method is performed by the wireless energy extracting device 3 of this embodiment when determining that the estimated power required by the energy consuming device 800 is non-zero, and includes the following steps 51-53.

In step 51, the RF generator module 31 wirelessly receives the RF charging signal to generate electrical energy.

In step 52, the energy management module 33 performs electrical energy transfer among the RF generator module 31, the capacitor module 32, the energy consuming device 800 and the external energy source 900. Step 52 includes the following sub-steps 521-523.

In sub-step 521, when the energy management module 33 determines that the detected output power of the RF generator module 31 is greater than or equal to the estimated power required by the energy consuming device 800, the energy management module 33 operates in the first state where electrical energy transfer from the RF generator module 31 to at least the energy consuming device 800 is performed.

In sub-step 522, when the energy management module 33 determines that the detected output power of the RF generator module 31 is smaller than the estimated power required by the energy consuming device 800 while the detected residual electric quantity of the capacitor module 32 is greater than or equal to the lower limit value, the energy management module 33 operates in the second state where electrical energy transfer from the RF generator module 31 and the capacitor module 32 to the energy consuming device 800 is performed.

In sub-step 523, when the energy management module 33 determines that the detected output power of the RF generator module 31 is smaller than the estimated power required by the energy consuming device 800 while the detected residual electric quantity of the capacitor module 32 is smaller than the lower limit value, the energy management module 33 operates in the third state where electrical energy transfer from the RF generator module 31 and the external energy source 900 to the energy consuming device 800 is performed.

In step 53, the energy management module 33 sets the lower limit value to be equal to one of the discharge threshold and the cutoff threshold.

It should be noted that: (a) the RF charging device 700 may be designed to consecutively transmit the RF charging signal, to transmit the RF charging signal when the power required by the energy consuming device 800 is non-zero, or to periodically transmit the RF charging signal; and (b) the RF generator module 31 may be designed to receive the RF charging signal when the power required by the energy consuming device 800 is non-zero, or to periodically or non-periodically receive the RF charging signal. However, the disclosure is not limited thereto.

In this embodiment, the lower limit value is set to be equal to one of the discharge threshold and the cutoff threshold. However, in other embodiments, the discharge threshold and the setting of the lower limit value may be omitted, and the lower limit value may be always equal to the cutoff threshold.

In view of the above, since the energy management module 33 transfers at least a portion of the electrical energy generated by the RF generator module 31 directly to the energy consuming device 800, at most a portion of the electrical energy generated by the RF generator module 31 is transferred first to the capacitor module 32 and then to the energy consuming device 800. Therefore, the wireless energy extracting device 3 of this embodiment has relatively low electrical energy loss and thus relatively high energy usage efficiency.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A wireless energy extracting device comprising:
 a radio frequency (RF) generator module for wirelessly receiving an RF charging signal to generate electrical energy;
 a capacitor module; and
 an energy management module coupled to said RF generator module, said capacitor module, an energy consuming device and an external energy source, and performing electrical energy transfer among said RF generator module, said capacitor module, the energy consuming device and the external energy source;
 when said energy management module determines that output power of said RF generator module is greater than or equal to power required by the energy consuming device, said energy management module operating in a first state where electrical energy transfer from said RF generator module to at least the energy consuming device is performed;
 when said energy management module determines that the output power of said RF generator module is smaller than the power required by the energy consuming device while a residual electric quantity of said capacitor module is greater than or equal to a lower limit value, said energy management module operating in a second state where electrical energy transfer from said RF generator module and said capacitor module to the energy consuming device is performed;
 when said energy management module determines that the output power of said RF generator module is smaller than the power required by the energy consuming device while the residual electric quantity of said capacitor module is smaller than the lower limit value, said energy management module operates in a third state where electrical energy transfer from said RF generator module and the external energy source to the energy consuming device is performed.

2. The wireless energy extracting device of claim 1, wherein, in the first state,
electrical energy transfer from said RF generator module to the energy consuming device and said capacitor module is performed when said energy management module determines that the output power of said RF generator module is greater than the power required by the energy consuming device while the residual electric quantity of said capacitor module is smaller than a saturation threshold, and
electrical energy transfer from said RF generator module to the energy consuming device is performed otherwise.

3. The wireless energy extracting device of claim 1, wherein:
said energy management module sets the lower limit value to be equal to one of a discharge threshold and a cutoff threshold smaller than the discharge threshold;
the lower limit value is set to be equal to the discharge threshold when said energy management module operates in any of the first and third states, and to be equal to the cutoff threshold when said energy management module operates in the second state.

4. A wireless energy extracting method to be implemented in a wireless energy extracting device, the wireless energy extracting device including a radio frequency (RF) generator module, a capacitor module, and an energy management module that is coupled to the RF generator module, the capacitor module, an energy consuming device and an external energy source, said wireless energy extracting method comprising:
(A) wirelessly receiving, by the RF generator module, an RF charging signal to generate electrical energy; and
(B) performing, by the energy management module, electrical energy transfer among the RF generator module, the capacitor module, the energy consuming device and the external energy source;
wherein step (B) includes
(B1) when it is determined by the energy management module that output power of the RF generator module is greater than or equal to power required by the energy consuming device, operating, by the energy management module, in a first state where electrical energy transfer from the RF generator module to at least the energy consuming device is performed,
(B2) when it is determined by the energy management module that the output power of the RF generator module is smaller than the power required by the energy consuming device while a residual electric quantity of the capacitor module is greater than or equal to a lower limit value, operating, by the energy management module, in a second state where electrical energy transfer from the RF generator module and the capacitor module to the energy consuming device is performed, and
(B3) when it is determined by the energy management module that the output power of the RF generator module is smaller than the power required by the energy consuming device while the residual electric quantity of the capacitor module is smaller than the lower limit value, operating, by the energy management module, in a third state where electrical energy transfer from the RF generator module and the external energy source to the energy consuming device is performed.

5. The wireless energy extracting method of claim 4, wherein, in the first state,
electrical energy transfer from the RF generator module to the energy consuming device and the capacitor module is performed when it is determined by the energy management module that the output power of the RF generator module is greater than the power required by the energy consuming device while the residual electric quantity of the capacitor module is smaller than a saturation threshold, and
electrical energy transfer from the RF generator module to the energy consuming device is performed otherwise.

6. The wireless energy extracting method of claim 4, further comprising:
(C) setting, by the energy management module, the lower limit value to be equal to one of a discharge threshold and a cutoff threshold smaller than the discharge threshold;
wherein the lower limit value is set to be equal to the discharge threshold when the energy management module operates in any of the first and third states, and to be equal to the cutoff threshold when the energy management module operates in the second state.

* * * * *